Figure 1:
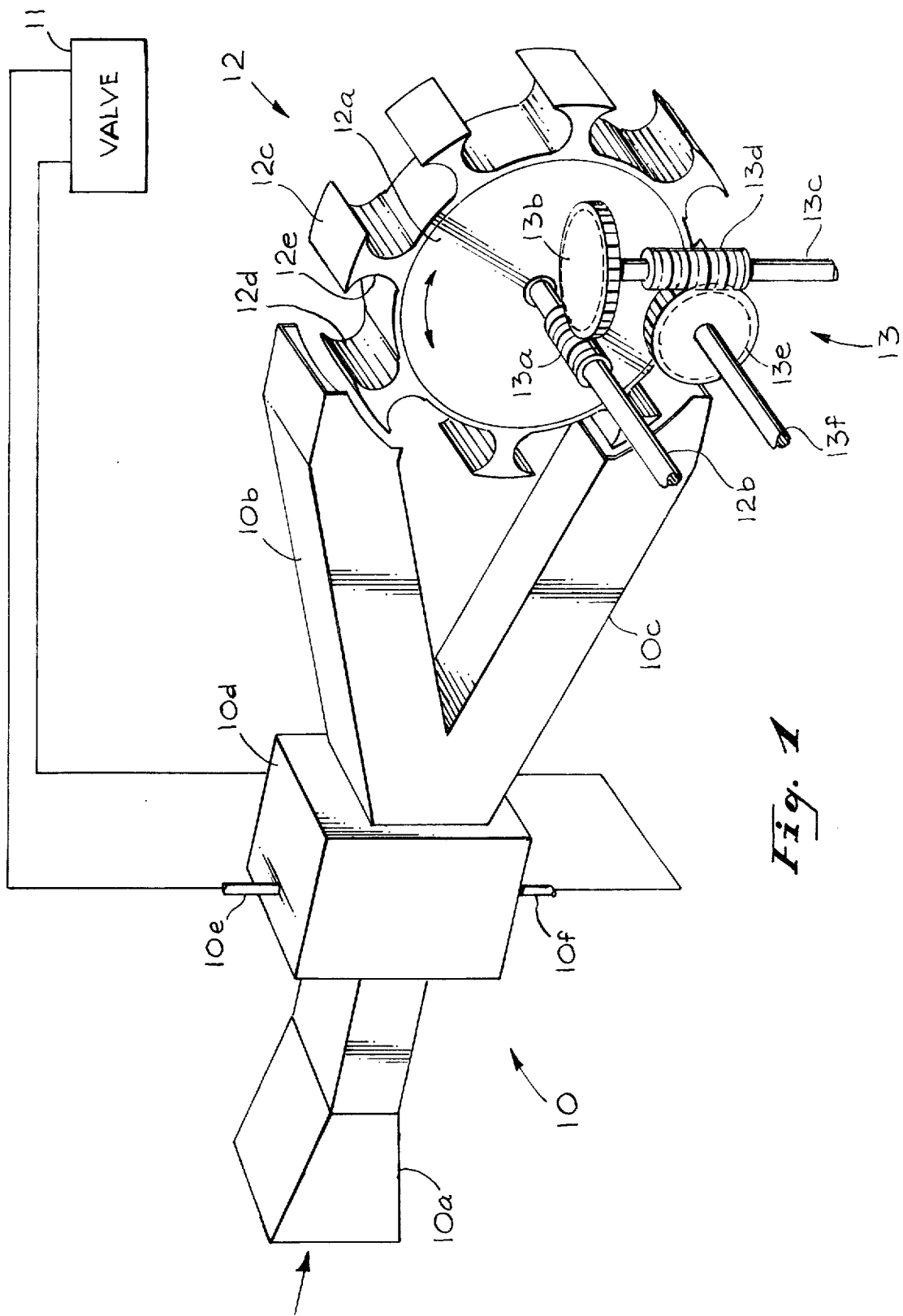

United States Patent [19]
Osheroff

[11] 3,904,310
[45] Sept. 9, 1975

[54] FLUIDIC CONTROL MECHANISM

[75] Inventor: Gene W. Osheroff, Las Vegas, Nev.

[73] Assignee: Fluidtech Corporation, Inglewood, Calif.

[22] Filed: Dec. 14, 1973

[21] Appl. No.: 424,872

[52] U.S. Cl. ............................... 415/152; 415/51
[51] Int. Cl. .............................................. F01d 1/30
[58] Field of Search ............ 415/1, 47, 49, 152, 51; 137/821, 830, 832

[56] References Cited
UNITED STATES PATENTS

| | | | |
|---|---|---|---|
| 684,800 | 10/1901 | Doble | 415/152 |
| 948,916 | 2/1910 | Boddy | 415/152 |
| 3,260,271 | 7/1966 | Katz | 415/1 |
| 3,282,562 | 11/1966 | Baver | 415/152 |
| 3,680,226 | 8/1972 | Osheroff | 137/805 |
| 3,708,247 | 1/1973 | Warren | 137/821 |

Primary Examiner—C. J. Husar
Assistant Examiner—L. J. Casaregola
Attorney, Agent, or Firm—Allen E. Botney

[57] ABSTRACT

The present invention provides a fluidically operated control mechanism that is responsive to temperature, pressure or displacement variations to rotate an output shaft or gear in either a clockwise or counterclockwise direction. The mechanism comprises a type of paddle wheel to which the output shaft or gear is coupled, the wheel itself being coupled to the two output ducts or channels of a fluidic oscillator that functions under the control of a temperature-sensitive, pressure-sensitive, or displacement-sensitive valve. The paddle wheel and, therefore, the output shaft or gear will turn in one direction or the other according to the net output of the two output channels.

13 Claims, 4 Drawing Figures

FLUIDIC CONTROL MECHANISM

The present invention relates to control mechanisms in general and more particularly relates to a fluidically operated control mechanism.

Control devices of various kinds are used in innumerable places in science and industry. This is particularly true in connection with the flow of fluids where, due to changing parameters, such as changes in temperature, pressure, volume, displacement, or the like, it becomes necessary to change the direction of flow of the fluid, or slow it down, or stop it altogether. Innumerable examples could be given, but one good example that can be visualized and understood by all is the air-conditioning field where, under temperature or thermostatic control, the flow of conditioned air to a room is constantly being increased or reduced, or stopped altogether.

In the past, the control devices used for these various purposes have been of an electrical, mechanical or electro-mechanical nature, thereby adding to the power consumption and maintenance problems and costs of the system in which they are employed. Furthermore, in many instances, the selling price or, stated differently, the cost of the control device is considerable, which also adds to the price of any system and thereby makes it that much more expensive. In the air-conditioning field, for example, dampers are customarily used to vary the flow of the conditioned air and these dampers are, of course, driven by electrical motors which, in turn, require a source of electrical power.

The present invention overcomes or avoids many of the problems encountered with these prior art control devices, some of these problems having been mentioned hereinabove. In accordance with the basic concept of the invention, this is accomplished by using parameter-controlled fluidic oscillator means to operate or drive a paddle-wheel type of device which, in turn, may drive a gear, a shaft, or any other suitable output apparatus. As indicated earlier, the parameters may be temperature, pressure, displacement, or the like. The advantages of such an invention are manyfold, some of which will be mentioned here. Thus, when used in connection with fluid flow, a small portion of the flow is tapped off by an embodiment of this invention and used by it as the driving force, thereby eliminating the need for any separate motor and/or electrical power supply. Second, fluidic devices can be fabricated out of almost any material, including plastics, and they do not have any moving parts in them. Third, an embodiment of the present invention would tend to be more sensitive or reactive to changing conditions than controls found in the prior art. For the several reasons mentioned, it can be seen that embodiments of the present invention would tend to be cheaper, more maintenance free, more responsive and more accurate, of longer life, etc.

Accordingly, it is an object of the present invention to provide a control mechanism that is fluidically operated.

It is another object of the present invention to provide a control mechanism in which fluid flow is the driving or power source.

It is a further object of the present invention to provide a control mechanism that does not require mechanical and/or electrical power for its operation.

It is an additional object of the present invention to provide a control mechanism in which the direction of rotation of an output gear or shaft and the extent of said rotation is controlled by the output flow of a fluidic oscillator.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figures 2, 3, 3A:
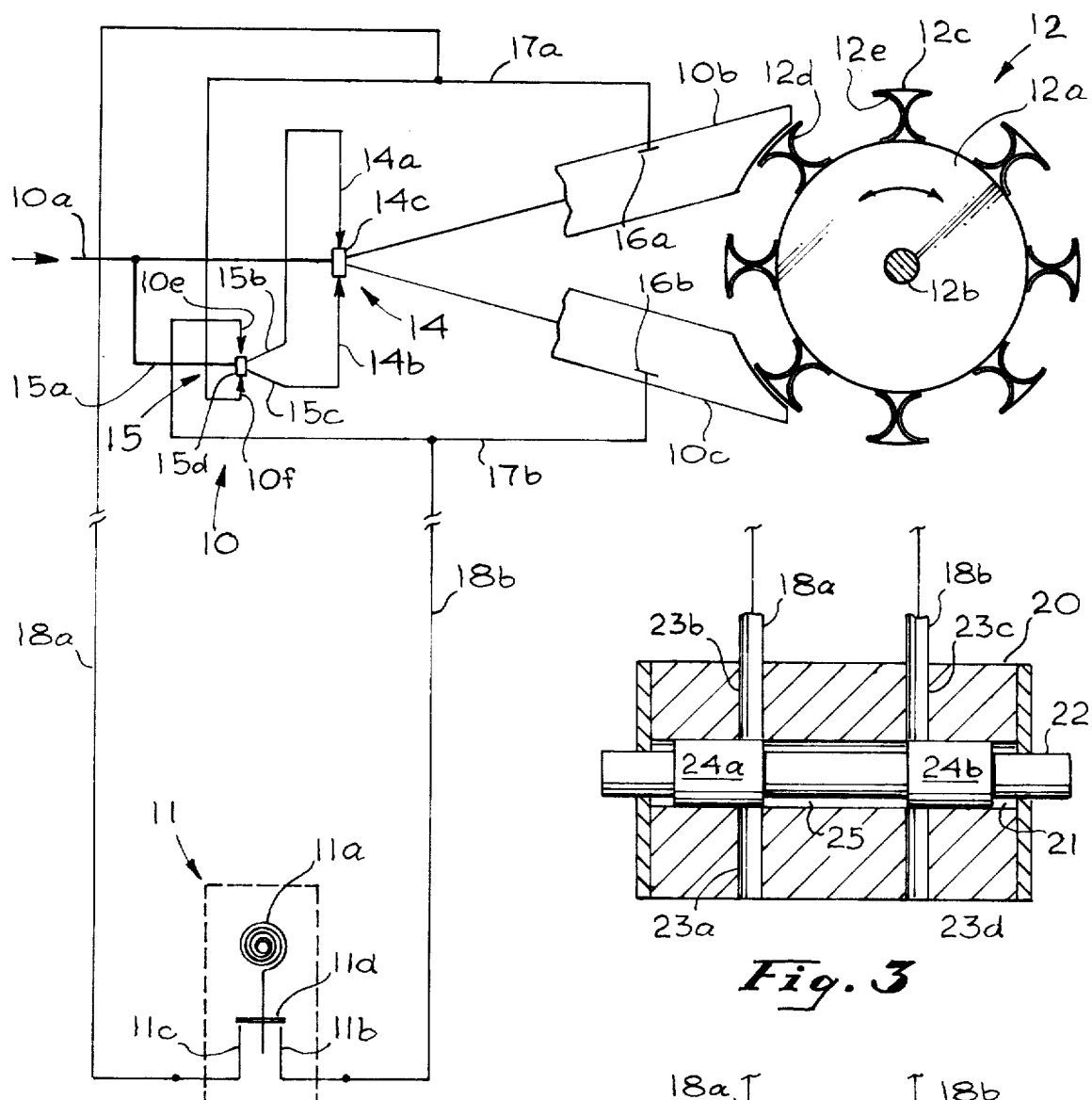

FIG. 1 illustrated a preferred embodiment of a control mechanism according to the present invention in which the fluidic oscillator and valve devices are basically shown in block form;

FIG. 2 substantially reproduces the FIG. 1 embodiment in which the fluidic oscillator is schematically illustrated and in which the valve is shown as a thermovalve, also schematically illustrated; and FIGS. 3 and 3a illustrate a pressure valve that may be used in lieu of the FIG. 2 thermovalve. FIGS. 3 and 3a show two different operating conditions of the valve.

For a more detailed understanding and appreciation of the invention, reference is made to the drawings wherein, in FIG. 1, an embodiment is shown to basically include a fluidic oscillator, generally designated 10, a valve 11 coupled to and controlling the operation of the oscillator, as will more fully be explained later, and a rotatably mounted paddle wheel, generally designated 12, coupled to receive the fluidic output of the oscillator and turned in either a clockwise or counter-clockwise direction by it.

The diagram of fluidic oscillator 10 is in schematic form and, therefore, represents any one of a number of such devices that may be used. However, irrespective of the kind of fluidic oscillator used, it will basically include, as is shown by the schematic, an input channel 10a, a pair of output channels 10b and 10c, additional fluidic apparatus 10d, between the input and output channels and a pair of control channels 10e and 10f. Generally speaking, the oscillator is such that a steady state stream of fluid, either liquid or gas, enters the oscillator via input channel 10a, passes through fluidic apparatus 10d, and then emerges from the two output channels 10b and 10c as two trains of fluid pulses, respectively. More particularly, oscillator 10 converts the steady stream of fluid into pulses of fluid that are alternately applied by the oscillator to its two output channels, the duration of the pulses through these channels being generally different from one another and also varying with the passage of time. The duration of these pulses is under the control of or, stated differently, regulated by valve 11 which, in turn, means that their duration is a function of the parameter or parameters governing the operation of the valve. As will be pointed out later, these parameters may be those of temperature, pressure, volume, or the like.

With respect to fluidic oscillator 10, although the construction and operating principles of fluidic oscillator devices are well known, there are so many different species or variations of them that it is possible that not all of them will be applicable or adaptable for use herein. Accordingly, it is deemed judicious to identify some specific types of fluidic oscillators as examples of those that can definitely be utilized as such in the FIG. 1 embodiment. Towards this end, therefore, reference is made to U.S. Pat. No. 3,680,776 entitled "Fluidic Apparatus for Air-Conditioning Systems," by Gene W. Osheroff, issued Aug. 1, 1972, wherein several species of a fluidic oscillator are shown and described which, under the control of a thermovalve, operate to deliver fluidic pulses of variable duration to its output channels. The portions of said patent illustrating and describing said oscillators are incorporated herein by said reference as though they were fully set forth. However, for sake of clarity, and to provide a firmer grasp of the invention, one of said species of oscillators has been reproduced in FIG. 2 herein and will hereinafter be described.

Considering now paddle wheel 12, it may be described as having a central wheel section 12a that is fixedly mounted on a shaft 12b, and a rim or peripheral section 12c that is constructed or fabricated in such a manner as to resemble a plurality of concave-shaped paddles, of which paddles 12d and 12e are typical. More particularly, as may be seen from the figure, the paddles along the wheel may be considered as being in either of two sets, one set comprising all the paddles facing in one direction, such as those facing like paddle 12d, and the other set comprising all the paddles facing in the opposite direction, such as those facing like paddle 12e. Stated differently, the paddles in the two sets are respectively arranged in pairs, back-to-back, so that each pair, in a sense, resembles the letter "x" of the alphabet. As may also be seen from the figure, paddle wheel 12 is positioned and oriented so as to lie in the plane of fluidic oscillator 10 and adjacent its output channels 10b and 10c, with the result that the pulsed output from these channels impinges or "plays" upon the aforesaid plurality of paddles. As will be recognized by those skilled in the art, the paddles are concave-shaped so as to maximize the force of the fluidic pulses striking them. As will be explained later, wheel 12 will turn in one direction or the other in response to these pulses, except for one situation in which the wheel remains substantially stationary.

To more fully illustrate the utility of the present invention, a gear arrangement, generally designated 13, is shown coupled to and operated by the paddle wheel. As may be seen from the figure, the gear arrangement includes a first gear 13a that is fixedly mounted on shaft 12b and that meshes with a second gear 13b, the latter gear being fixedly mounted on a rotatable shaft 13c. Further gearing may be included, if necessary, such as gear 13d fixedly mounted on and rotatable with shaft 13c and that meshes with gear 13e which is itself fixedly mounted on a rotatable shaft 13f. It will be recognized by those skilled in the art that the gearing arrangement described may be in a step-up or step-down ratio so that, for example, 10 or 50 or 100 revolutions of paddle wheel 12 may ultimately result in only 1 revolution of shaft 13f.

In considering the operation of the FIG. 1 embodiment, it should be mentioned again that oscillator 10 respectively produces two trains of fluid pulses at its output channels 10b and 10c, the duration of the pulses in one train generally varying with the passage of time and generally differing from the duration of the pulses in the other train. However, since the total amount of fluid exiting from the oscillator must be equal to the amount entering it, it will be recognized that the duration of the pulses in one pulse train will become smaller as the duration of the pulses in the other train becomes larger, and vice versa. Thus, the duration of the fluid pulses coming out of output channel 10b will grow smaller as the duration of the fluid pulses emerging from output channel 10c grows larger, and vice versa. As previously mentioned, the relative duration of these pulses is a function of valve 11 and the parameters to which it is sensitive.

The fluid pulses out of output channel 10b strike paddles 12e and, consequently, tend to turn wheel 12 in a clockwise direction. The fluid pulses out of output channel 10c, on the other hand, strike paddles 12d and, consequently, tend to turn wheel 12 in a counterclockwise direction. Thus, one train of pulses tends to rotate the wheel in a clockwise direction and the other train of pulses tends to rotate the wheel in a counterclockwise direction, and whether the wheel will rotate in one direction or the other at any one time will be determined by which of the trains has the pulses of longer duration at the time. By way of example, if at time "$t_1$" the fluid pulses out of output channel 10b are of longer duration than those out of output channel 10c, then at time $t_1$ wheel 12 will rotate in a clockwise direction. On the other hand, if at a later time, namely, at time "$t_2$", the fluid pulses out of output channel 10b are of shorter duration than those out of output channel 10c, then at this time $t_2$ wheel 12 will rotate in a counterclockwise direction. However, if the pulses out of the two output channels are of equal duration, then the wheel will not rotate but, instead, will flicker back and forth over a short arc determined by the spacing of the paddles.

As was previously indicated, shaft 12b will rotate with the wheel and this rotation of the shaft may be used to drive any number of devices. However, the rotational power of the shaft may first be applied through gear arrangement 13 before it is finally applied and utilized.

Reference is now made to FIG. 2 wherein a particular species of oscillator 10 is schematically illustrated, and wherein a thermovalve 11 is employed in combination with it. Wherever possible, the same designations will be used in connection with FIG. 2 as were used in FIG. 1.

Fluidic oscillator 10 is shown to comprise two fluidic amplifiers, both preferably of the bistable type, one being generally designated 14 and the other being generally designated 15. Amplifier 14 includes the aforesaid input channel 10a, the aforesaid pair of output channels 10b and 10c, a pair of control channels respectively designated 14a and 14b, and a chamber 14c located between the input and output channels and through which the fluid stream must pass in going from the input channel to the output channels. In the schematic, control channels 14a and 14b respectively lead to opposite sides of chamber 14c in order to exercise the desired control over the fluid flow therein, as is well known and understood by those skilled in the art and as will more clearly appear later.

Fluidic amplifier 15 is coupled between the input and output channels of amplifier 14 as well as to its control channels, and, like amplifier 14, includes an input channel 15a, a pair of output channels respectively designated 15b and 15c, the aforesaid pair of control channels 10e and 10f, and a chamber 15d located between its input and output channels. Control channels 10e and 10f are likewise coupled to opposite sides of chamber 15d. As shown in the figure, input channel 15a is coupled to input channel 10a so that a small percentage of the fluid stream entering input channel 10a is tapped off and enters input channel 15a. As is also shown output channels 15b and 15c respectively connect to control channels 14a and 14b, with the result that fluid entering one or the other of output channels 15b and 15c flows into and ultimately through its associated control channel to chamber 14c.

Completing the construction of the FIG. 2 oscillator is a pair of Pitot tubes respectively designated 16a and 16b and which are respectively mounted in output channels 10b and 10c. As shown in the figure, Pitot tubes 16a and 16b are respectively connected to control channels 10f and 10e via feedback channels 17a and 17b. Pitot tubes 16a and 16b and, therefore, control channels 10e and 10f, are also connected to thermovalve 11 which basically comprises a coiled bi-metallic member 11a, a member containing a pair of ports or orifices designated 11b and 11c, and a sliding plate member 11d that is coupled to the bi-metallic member and that slides back and forth over said ports to uncover or expose one or the other of them in response to ambient temperature conditions. As shown in the figure, ports 11b and 11c are respectively connected to control channels 10e and 10f (and to Pitot tubes 16a and 16b) via channels 18a and 18b. Any one of a number of different thermovalves are available and may be used, but one that has been found to be suitable for use herein is shown and described in U.S. Pat. No. 3,730,430 entitled "A Thermovalve" by Gene W. Osheroff, issued May 1, 1973. The pertinent illustrative and descriptive portions of said patent are incorporated herein by this reference as though they were fully set forth.

Considering now the operation of the embodiment as illustrated in FIG. 2, it will be assumed that the fluid flowing through oscillator 10 is initially exiting through outlet channel 10c. It is also initially assumed, therefore, that the fluid flowing through amplifier 15 is exiting through output channel 15b and from this output channel to control channel 14a. Finally, it will initially be assumed that the ambient temperature for thermovalve 11 is such that bi-metallic strip 11a is in its center position, that is to say, in the position in which ports 11b and 11c are fully closed or covered by plate 11d. Needless to say, the bi-metallic coil is in said center position and ports 11b and 11c are both closed when the temperature at which the thermovalve is set is substantially the same as the ambient temperature.

Accordingly, with these assumptions in mind, a small portion of the fluid flowing in output channel 10c is picked up by Pitot tube 16b wherein it then travels both to control channel 10e and port 11b. Since, as was previously assumed, port 11b is closed, this fluid that is fed back to it cannot escape and it therefore enters control channel 10e wherein the full force thereof is applied to the fluid stream flowing through chamber 15d. As a result and in accordance with well known and established fluidic principles, the direction of this stream of fluid is switched from output channel 15b to output channel 15c. When this happens, the stream is directed through control channel 14b against the main fluid stream flowing through chamber 14c and this, in turn, causes the main stream to switch its flow from output channel 10c to output channel 10b.

However, it will be recognized that just as soon as the fluid begins to flow in output channel 10b, Pitot tube 16a picks up a small portion of this fluid and channels it back both to control channel 10f and to port 11c. Since port 11c is also completely closed, the fluid thusly fed back likewise cannot escape through port 11c and, therefore, the fluid ends up entering control channel 10f wherein the full force thereof is once again applied to the stream flowing through chamber 15d to switch it from output channel 15c to output channel 15b. When this occurs, this fluid stream is once again directed through control channel 14a to chamber 14c, thereby causing the main fluid stream to return to its initially assumed flow pattern, namely, to output channel 10c.

The cycle of operation described above repeats itself over and over again so long as thermovalve plate 11d is centered and both ports 11b and 11c thereby closed. In short, oscillator 10 and thermovalve 11 cooperate to produce a pulsed oscillation in which the fluid stream flowing through the oscillator switches back and forth equally between its output channels 10b and 10c. Thus, under the conditions just described, namely, where ports 11b and 11c are both closed, the pulses of fluid out of the two output channels are of equal duration. Under such circumstances, wheel 12 will not rotate and remains substantially immobile so long as said pulses are of equal duration. By way of explanation, a fluid pulse out of output channel 10b impinges on a paddle 12c and thereby causes wheel 12 to move through a small arc in a clockwise direction. A moment later, however, a fluid pulse out of output channel 10c impinges on a paddle 12d and thereby causes wheel 12 to move through the same small arc, but in a counter-clockwise direction. Accordingly, the wheel will flicker back and forth a bit through a few degrees of arc when the pulses are of equal duration, but will not rotate. For all practical purposes, it can be said that the wheel remains stationary under said circumstances.

For a further understanding of the operation of this fluidic control mechanism, assume now that bi-metallic strip 11a is in its extreme closkwise position, as a result of which port 11b is totally open and port 11c is totally closed. As before, it will also be assumed that the fluid stream is initially exiting through output channel 10c. Accordingly, a small portion of the fluid flowing in channel 10c is picked up by Pitot tube 16b and fed back by it both to control channel 10e and port 11b. However, since port 11b is completely open, this fluid that is fed back unrestrictedly escapes through the port, with the result that very little if any of this fluid enters control channel 10e. Consequently, the fluid flowing through amplifier 15 continues to exit from output channel 15b which, in turn, means that the main fluid stream likewise continues to exit from output channel 10c. It can thus be seen so long as port 11b is entirely open, 100% of the fluid stream emerges from channel 10c and 0% emerges from channel 10b. Stated differently, with port 11b completely open, the oscillator doesn't oscillate but, rather, directs all of the fluid entering and flowing through it out through channel 10c. In this kind of situation, therefore, a steady state fluid stream is directed against paddles 12d which thereby causes wheel 12 to rotate in a counterclockwise direction. Of course, this is an extreme condition and may not continue for very long if and when it does occur.

Assuming now that bi-metallic strip 11a is in its extreme counterclockwise position so that port 11b is closed and port 11c totally open, and assuming again that the fluid is initially exiting through output channel 10c, a small portion of the fluid flowing in the channel is picked up by Pitot tube 16b and, as before, fed back to control channel 10e and port 11b. In this instance, however, port 11b is closed, with the result that the fluid fed back by the Pitot tube enters control channel 10e to cause the fluid passing through chamber 15d to switch from output channel 15b to output channel 15c. When this happens, this secondary fluid stream is directed through control channel 14b into chamber 14c wherein it impinges against the main fluid stream flowing therethrough to cause it to switch from output channel 10c to output channel 10b. With the fluid now flowing in output channel 10b, Pitot tube 16a picks up a small portion of it and feeds it back to control channel 10f and port 11c. However, since port 11c is now completely open, the fluid fed back escapes through it, with the result that very little if any of this fluid actually enters control channel 10f. Thus, under these conditions, namely, with port 11c completely open and port 11b closed, 100% of the fluid entering and flowing through the oscillator flows out of output channel 10b and 0% flows out of output channel 10c. In this kind of situation, therefore, a steady state fluid stream is directed against paddles 12e to thereby cause the wheel to rotate in a clockwise direction.

It will be recognized by those skilled in the art that when the mechanism is operating in one or the other of the extreme conditions described, the paddle wheel is then rotating at maximum speed, that is to say, its revolutions per unit of time, either in a clockwise or a counterclockwise direction, will be a maximum. Thus, when both ports are closed, the wheel is stationary and when one or the other of the ports is completely open, the wheel rotates at maximum speed. As may be guessed from the above, the wheel will rotate at some intermediate speed when one of the ports is only partially open.

When coiled bi-metallic strip 11a moves somewhat in a clockwise direction so that plate 11d slides somewhat to the left to partially open port 11b, port 11c remaining closed, a constriction exists at port 11b so that fluid fed back to it by Pitot tube 16b cannot escape as easily as it did before when port port 11b was fully open. As a result, some of this fluid does enter control channel 10e and pressure begins to build up there, and when this pressure reaches the designed for level it causes the secondary fluid stream passing through chamber 15d to flip or switch to output channel 15c which, in turn, causes the main fluid stream to switch from output channel 10c to output channel 10b, as previously described. With the fluid stream now flowing in output channel 10b, some of it is fed back by Pitot tube 16a, as already mentioned. However, with port 11c closed, the fluid immediately enters control channel 10f to exert pressure against the secondary stream in chamber 15d and, as was previously described in detail, this quickly leads to the main fluid stream being switched back to output channel 10c. Hence, with port 11c closed and port 11b only partially open, once again a pulsed or pulse modulated operation exists but this time, however, the fluid pulses are not of equal duration as they were when both ports were closed. Rather, an oscillation exists in which unequal pulses of fluid emerge from output channels 10b and 10c, a relatively short pulse out of channel 10b and a longer pulse out of channel 10c. Under these circumstances, wheel 12 rotates in a counterclockwise direction since the fluid impinges upon paddles 12d for a longer period of time that it does upon paddles 12e. Moreover, as was previously pointed out, the rotational speed of the wheel will be at some intermediate value as determined by the relative durations of the pulses.

Of course, the relative pulse durations at any one time will depend on the position of thermovalve strip 11a at that time which, in turn, will depend on the difference between the thermovalve's ambient temperature and the temperature to which it is set.

Finally, considering the situation when coil 11a has moved somewhat in a counterclockwise direction so that port 11b is closed and port 11c partially open, a constriction now exists at port 11c to that fluid fed back to it by Pitot tube 16a cannot escape as freely as it did when this port was fully open. Accordingly, for the same reasons as previously presented when port 11b was partially open, the fluid flowing through the oscillator flips back and forth between channels 10b and 10c with the fluid pulses out of channel 10b being of longer duration. In consequence thereof, the fluid impinges on paddles 12e for a longer period of time than on paddles 12d, with the result that wheel 12 now turns in a clockwise direction, the speed of rotation depending on the difference between the durations of said pulses.

The valve described hereinabove is one that operates as a function of temperature. However, this is not the only kind of valve that may be used in an embodiment of the present invention, as may be seen from FIGS. 3 and 3(a) wherein a pressure-operated valve device is illustrated. As shown therein it includes a solid body member 20 through which there is a channel or bore 21 in which a shaft or piston 22 is slidably mounted. Cut or formed in body member 20 are four orifices or ports 23a–23d, channels or tubes 18a and 18b respectively connecting to ports 23b and 23c, as shown in the figure. Channels or tubes 18a and 18b, it will be remembered from FIG. 2, intercouple the valve's ports with Pitot tubes 16a and 16b and with control channels 10e and 10f. Accordingly, if the FIG. 3 pressure valve were to be substituted for the FIG. 2 thermovalve, then in that event, tube 18a in FIG. 3 would connect to channel or tube 17a in FIG. 2 and, likewise, tube 18b in FIG. 3 would connect to channel or tube 17b in FIG. 2. Consequently, port 23b would connect with Pitot tube 16a and control channel 10f, and port 23c would connect with Pitot tube 16b and control channel 10e. As for ports 23a and 23d, they are unconnected to anything in that they are exposed or open to the ambient space of the thermovalve. Completing the FIG. 3 valve structure are two segments 24a and 24b fixedly mounted on shaft 22 and of the same diameter as bore 21. As is illustrated in FIG. 3, segments 24a and 24b are so located on shaft 22 that when the shaft is in a neutral or center position, that is to say, when the shaft has not been displaced either to the right or to the left, the segments just cover and, therefore, close ports 23a–23d. However, if shaft 22 is moved slightly either to the right or to the left, one or the other of ports 23b and 23c is partially opened to ambient, and this is due to the fact that the shaft between the segments is of smaller diameter than that of the segments or of the bore, thereby providing a space 25 between the shaft and the wall of the bore that couples port 23b to port 23a when the shaft is moved to the left, that is to say, in the direction of arrow 26, and that couples port 23c to port 23d when the shaft is moved to the right, that is to say, in the direction of arrow 27.

Considering now the operation of the control mechanism with the pressure-operated valve in it, it will initially be assumed that the valve is in the condition shown in FIG. 3, which is the condition in which ports 23a–23d are closed. It will be recognized by those skilled in the art that with the pressure valve in this condition, the situation is the same as that previously described in connection with the thermovalve when ports 11b and 11c were both closed. Accordingly, to avoid being redundant, suffice it to say that with ports 23a–23d closed, fluidic osciallator 10 produces pulses of equal duration at its output channels 10b and 10c, with the result, as previously explained, that wheel 10 does not rotate in either direction.

If, now, the condition of the valve is taken as that shown in FIG. 3(a) in which shaft 22 has been moved slightly to the left, that is to say, in the direction of arrow 26, to thereby partially open and intercouple ports 23a and 23b, then it will be recognized by those skilled in the art that this condition of the pressure valve is comparable to that of the thermovalve in which port 11c was partially open. When this occurred, it will be remembered, the fluid pulses coming out of output channels 10b and 10c and impinging on the paddle wheel were of unequal duration, with the pulses out of channel 10b being of longer duration, and this is what happens when ports 23a and 23b are partially open. Under the FIG. 3(a) condition of the valve, therefore, the paddle wheel is rotated in a clockwise direction at a speed corresponding to the difference in the pulse durations. It will be recognized that the wheel will continue to rotate in said direction at one speed or another so long as ports 23a and 23b remain partially open. It will also be recognized from the prior description that if ports 23a and 23b should become fully open, then in that event the fluid will emerge from output channel 10b as a steady stream, this being an extreme condition. At this point, of course, the wheel will rotate at a maximum speed.

On the other hand, if shaft 22 is moved slightly to the right, that is to say, in the direction of arrow 27, to partially open and intercouple ports 23c and 23d, then it will be recognized by those skilled in the art that this condition of the pressure valve is comparable to that of the thermovalve in which port 11b was partially open, which means that with ports 23c and 23d partially open, the fluid pulses coming out of output channels 10b and 10c are of unequal duration, with those out of channel 10c being of longer duration and with wheel 12 rotated in a counterclockwise direction. As before, the wheel will continue to rotate in this counterclockise direction, at one speed or another, so long as ports 23c and 23c remain open.

The FIG. 3 valve has been referred to as a pressure valve because it is invisioned that if a pressure or force differential exists between the two ends of shaft 22, then the shaft will slide in one or the other of the two directions to respectively open one or the other pairs of ports.

Although a couple of arrangements of the invention have been illustrated above by way of example, it is not intended that the invention be limited thereto. Thus, for example, valves other than those specifically shown and described herein may be adapted for use in the invention. Again, it may be desirable to use more than one valve in any embodiment, and this can be done by connecting them either in series or in parallel with one another. Accordingly, the invention should be considered to include any and all modifications, alterations or equivalent arrangements falling within the scope of the annexed claims.

Having thus described the invention, what is claimed is:

1. A fluidic control mechanism powered by a steady-state fluid stream, said mechanism comprising: a rotatably mounted wheel member having a plurality of double-concave paddles equally spaced along the periphery thereof; and fluidic oscillator means for producing two trains of fluid pulses of variable duration from said fluid stream, said oscillator means including additional means for directing said trains of fluid pulses in a tangential manner against said wheel such that one of said trains of pulses tries to rotate said wheel in a clockwise direction and the other of said trains of pulses tries to rotate said wheel in a counterclockwise direction, the direction of rotation of said wheel at any one time being determined by which of said trains of pulses has the pulses of longer duration at said time.

2. The fluidic control mechanism defined in claim 1 wherein said wheel member includes a plurality of pairs of concave-shaped paddles mounted along the periphery of said wheel, each pair of said paddles being mounted back-to-back.

3. The fluidic control mechanism defined in claim 1 wherein said wheel member includes two sets of concave-shaped paddles mounted along the periphery of said wheel, one of said sets of paddles being positioned to have one of said trains of fluid pulses impinge thereon and the other of said sets of paddles being positioned to have the other of said trains of fluid pulses impinge thereon.

4. The fluidic control mechanism defined in claim 1 wherein siad additional means includes a pair of output channels positioned adjacent said wheel and through which said two trains of fluid pulses respectively flow, said fluidic oscillator means further including first means to swtich the fluid stream in an oscillatory manner between said output channels to produce said two trains of fluid pulses, and second means operable in response to a predetermined parameter to vary the duration of the pulses in said trains with changes in said parameter.

5. The fluidic control mechanism defined in claim 1 wherein said fluidic oscillator means includes first and second fluidic amplifiers with each having an input channel, a pair of output channels, a control chamber between its input and output channels, and a pair of control channels connecting to said control chamber, the input channel of said first amplifier connected to receive the fluid stream, the input channel of said second amplifier connecting to the input channel of said first amplifier, the pair of output channels of said first amplifier being positioned adjacent said paddle wheel and through which said two trains of fluid pulses respectively flow, and the pair of output channels of said second amplifier respectively connecting to the pair of control channels of said first amplifier; and switching means coupled to and between the output channels of said first amplifier and the control channels of said second amplifier for selectively applying pressures to said control channels in response to the flow of fluid in said output channels, said switching means including a valve sensitive to and operable in response to a predetermined parameter to apply said pressure to said control channels.

6. The fluidic control mechanism defined in claim 3 wherein said fluidic oscillator means includes oscillator apparatus that normally switches the fluid stream flowing therethrough back and forth between said two sets of paddles to produce said two trains of pulses that are respectively directed against them; and valving means sensitive to a predetermined parameter coupled to said oscillator apparatus for varying the duration of said pulses, the duration of the pulses applied to said two sets of paddles increasing and decreasing, respectively, with changes of said parameter in one pressures direction and decreasing and increasing, respectively, with changes of said paramter in an opposite direction.

7. The fluidic control mechanism defined in claim 4 wherein said wheel member includes two sets of paddles mounted along the periphery of said wheel, one of said sets of paddles being positioned to have one of said trains of pulses impinge thereon and the other of said sets of paddles being positioned to have the other of said trains of pulses impinge thereon.

8. The fluidic control mechanism defined in claim 4 wherein said second means incudes a thermovalve coupled to said first means and wherein said parameter is that of temperature.

9. The fluidic control mechanism defined in claim 4 wherein said second means includes a pressure valve coupled to said first means and wherein said parameter is that of pressure.

10. The fluidic control mechanism defined in claim 5 wherein said valve includes a first member having first and second ports, a movable second member for at all times closing at least one of said ports in response to said parameter, and a third member operable to move said second member in response to variations in the magnitude of said parameter, said first and second parts respectively being coupled to the output channels of said first amplifier and to the control channels of said second amplifier.

11. The fluidic control mechanism defined in claim 5 wherein said switching means further includes a pair of Pitot tubes respectively mounted in the pair of output channels of said first amplifier, and a pair of feedback channels respectively linking said pair of Pitot tubes and the pair of control channels of said second amplifier, said valve being coupled to said pair of feedback channels.

12. A fluidic control mechanism powered by a steady-state fluid stream, said mechanism comprising: a rotatably mounted paddle wheel; first means for converting the steady-state fluid stream to two trains of fluid pulses, said first means including additional means for applying one of said trains of pulses to one side of the paddles on said paddle wheel to rotate said wheel in a clockwise direction and applying the other of said trains of pulses to the other side of the paddles on said paddle wheel to rotate said wheel in a counterclockwise direction; and second means sensitive to a predetermined parameter for varying the durations of said fluid pulses according to the difference between two valves of said parameter, the direction of rotation of said wheel at any one time being determined by which of said trains has the pulses of longer duration at said time.

13. The fluidic control mechanism defined in claim 12 wherein said first means is a fluidic oscillator having an input channel into which the steady-state fluid stream flows and a pair of output channels out of which said two trains of fluid pulses respectively flow, and wherein said second means is a valve mechanism responsive to said parameter differentials to switch the steady-state fluid stream from one to the other of said output channels at intervals corresponding to the magnitudes of said parameter differential, thereby to produce said pulses of variable duration.

* * * * *